United States Patent [19]

Pequet et al.

[11] Patent Number: 4,769,555

[45] Date of Patent: Sep. 6, 1988

[54] MULTI-TIME DELAY POWER CONTROLLER APPARATUS WITH TIME DELAY TURN-ON AND TURN-OFF

[75] Inventors: John D. Pequet, Laguna Nigel; Michael B. Pulizzi, Anaheim; Roger Cook, Garden Grove, all of Calif.

[73] Assignee: Pulizzi Engineering Inc., Santa Ana, Calif.

[21] Appl. No.: 77,425

[22] Filed: Jul. 24, 1987

Related U.S. Application Data

[63] Continuation-in-part of Ser. No. 782,307, Oct. 1, 1985, Pat. No. 4,719,364.

[51] Int. Cl.⁴ .............................................. H02J 1/00
[52] U.S. Cl. ................................. 307/141; 307/132 E; 307/141.4; 307/112
[58] Field of Search ................. 307/3, 5, 36, 37, 38, 307/39, 40, 41, 112, 113, 115, 132 E, 132 R, 137, 139, 141, 141.4, 594–600; 361/1, 3, 22, 28, 33, 73, 83, 94, 97, 99, 139, 160, 195, 196; 364/146, 141, 143, 492, 493, 494; 340/309.4, 309.15

[56] References Cited

U.S. PATENT DOCUMENTS

| | | | |
|---|---|---|---|
| 3,050,713 | 8/1962 | Harmon | 307/596 |
| 3,178,591 | 4/1965 | Werme | 307/596 |
| 3,229,164 | 1/1966 | McCartney et al. | 307/132 E |
| 3,258,613 | 6/1966 | Feldheck et al. | 307/596 |
| 3,560,769 | 2/1971 | Shimizu | 307/596 |
| 3,628,068 | 12/1971 | Long | 307/596 |
| 3,639,844 | 2/1972 | Karklys | 307/596 |
| 3,700,914 | 10/1972 | Granieri et al. | 307/141 |
| 3,801,872 | 4/1974 | Zocholl et al. | 361/73 |
| 3,826,955 | 7/1974 | Fest | 307/598 |
| 4,011,517 | 3/1977 | Pommevening et al. | 307/590 |
| 4,016,474 | 4/1977 | Mason | 307/41 |
| 4,177,388 | 12/1979 | Lingenfelter | 307/38 |
| 4,215,277 | 7/1980 | Weiner et al. | 307/132 R |
| 4,227,062 | 10/1980 | Payne et al. | 307/41 |
| 4,234,801 | 11/1980 | Small | 307/115 |
| 4,245,319 | 1/1981 | Hedges | 307/38 |
| 4,270,573 | 6/1981 | Sturman et al. | 307/38 |
| 4,310,770 | 1/1982 | Keener et al. | 307/35 |
| 4,400,699 | 8/1983 | Glasmacher | 307/141 |
| 4,419,590 | 12/1983 | Voss | 307/41 |
| 4,674,031 | 6/1987 | Siska | 307/41 |

Primary Examiner—William M. Shoop, Jr.
Assistant Examiner—Paul Ip
Attorney, Agent, or Firm—Howard R. Lambert

[57] ABSTRACT

Multi-time delay power controller apparatus for providing time delayed power-up and power-down for associated electrical equipment, such as computer systems, comprises a power stage configured for connecting to a conventional power outlet, a D.C. power supply connected to an internal D.C. voltage bus, an output stage having a plurality of time delayed outputs and a plurality of time delay turn-on timing stages connected in electrical series with one another between the D.C. bus and ground. Each such stage comprises an R-C circuit and a type 555 integrated circuit which together function as a timer. Included in each stage is a control relay. The energizing coils of the relays in odd numbered stages are connected to ground and of even numbered stages to the D.C. bus. The timing stages are connected so that the timing out of one stage starts the timing of the next-in-sequence stage, the timing of the first-in-sequence stage being started when the apparatus is turned on. The control relays, which provide voltage to the time delayed output stages are energized, in sequence, when each stage times out. Timed delay turn-off means are provided for sequentially removing the voltages to the outputs in the reverse order in which voltage is applied by operation of the control relays. The time delay turn-off means include relays through which the time delay turn-on relays are energized and which cause deenergizing of the control relays in the turn-off sequence.

20 Claims, 5 Drawing Sheets

MULTI-TIME DELAY POWER CONTROLLER APPARATUS WITH TIME DELAY TURN-ON AND TURN-OFF

This is a continuation-in-part application of application Ser. No. 782,307, filed Oct. 1, 1985 now U.S. Pat. No. 4,719,364, issued Jan. 12, 1988.

BACKGROUND OF THE INVENTION

1. Field of the Invention

The present invention relates generally to the field of power controller apparatus for electrical and electronic equipment, and more particularly to time delay power controller apparatus for such equipment.

2. Background Discussion

It is well known by electrical engineers and most users of electrical or electronic equipment that when a piece of such equipment is turned on, a high turn-on electric current is usually caused in the equipment. Within several seconds, typically less than about 2–4 seconds, the turn-on current spike decays to a steady state operating current. The turn-on current spike is caused by the charging of cooperative elements and/or portions of the equipment and is dependent upon the rate of electrical charging of the equipment, as given by the equation:

$$I = dQ/dt,$$

wherein I is the current and dQ/dt is the time rate of charging (i.e., the charging rate).

From the above equation, it can be seen that a fast equipment turn-on time, for which dQ/dt is high, gives rise to a high current spike. Typically, the turn-on current spike is several times higher than the steady state or average current drawn by the equipment subsequent to turn-on.

The combined effect of individual high turn-on currents of each of several or a number of pieces of electrical or electronic equipment is that the current carrying capacity of an existing building electrical circuit into which the equipment is connected may be exceeded. This typically causes the associated electrical circuit breaker to trip open at the instant the equipment is turned on, thereby shutting down all the equipment on the circuit. This may occur even though the building circuit has the capacity for safely handling the combined steady state operating currents of all the equipment.

In some instances where several independent building electrical circuits are conveniently available, the possibility of overloading individual building circuits may be avoided by connecting different pieces of equipment into different circuits served by separate circuit breakers. However a multiplicity of separate building circuits is typically not available in a single room where a number of pieces of electrical or electronic equipment, for example, a computer and several associated disc drives, may be located. The installation of several independent building circuits to serve several different pieces of electrical equipment may be very costly and is typically impractical.

Although sometimes possible to do so, it is generally not feasible to substantially reduce turn-on current spikes by increasing equipment turn-on times (i.e., by increasing the "dt" term in the foregoing equation). Moreover, a slow rate of applying voltage may be damaging to many types of electrical equipment and motors and for safe operation requires the equipment to be specially designed.

As a consequence of high turn-on current problems associated with simultaneously turning on several pieces of electrical equipment, it is usually preferable to turn on just one piece of equipment at a time, with the interval between the turning on of successive pieces of equipment being sufficient to assure that the turn-on current drawn by a turned on piece of equipment has decayed to its normal operating level before the next piece of equipment is turned on. The following of such a time delayed turn on proceedure generally permits several pieces of electrical equipment to be operated from a single building circuit without overloading the circuit.

However, manual sequencing of several pieces of equipment is, itself, generally unsatisfactory because the required time interval between successive turn-ons is difficult to control. Also, it may be necessary or desirable to always follow the same, predetermined turn-on sequence for a particular system of interacting electrical equipment, and such sequencing may be difficult to assure by manual turn-on procedures. Out-of-sequence equipment turn-ons may cause system malfunctions, for example, loss of data in computer systems. It can, of course, be readily appreciated that specific turn-on schedules for particular electronic equipment systems may be desired or required even in situations in which high turn-on current spiking is not a problem or is not such a problem as to in and of itself require sequenced turn-on procedures.

Because of these and other turn-on problems, specialized power controller equipment has been developed. Exemplarly of advanced versions of such power controller apparatus is our above-identified prior application which discloses power controller apparatus having the capability for multiple time delayed turn-ons, and which thereby enables the operation of a plurality of different pieces of electrical or electronic equipment from a single power controller. Although the apparatus of our prior application has been determined to be very useful for controlling the turn-on of equipment in complex systems, such as computer or central processor systems, it does not provide for time delayed turning off of equipment as frequently may be desirable or necessary.

Even though sequential turning off of different pieces of interacting equipment is not required to reduce current spiking, it may be required to enable proper equipment shut-down schedules to prevent equipment damage, to prevent the loss of data or to prevent unsafe operating conditions. Thus, as an illustration, it may be necessary or desirable to shut down disc drives prior to turning off an associated central data processing unit in order to insure against the loss of computer data.

The present invention is, therefore, specifically directed to time delay power controller apparatus which provides time delayed power turn-off, with or without time delayed power turn-on being provided for the same equipment.

SUMMARY OF THE INVENTION

Time delay power controller apparatus, in accordance with the present invention comprises a power stage and means for connecting said power stage to a conventional power source, a plurality of time delayed outputs, a D.C. voltage bus and a ground, a D.C. power supply connected between the power stage and the D.C. bus and a plurality of time delay, turn-on timing stages connected between the D.C. bus and ground. Each of the turn-on timing delay stages comprises a timer initiating voltage input line, a time delay voltage output line, a control relay having an energizing coil connected to the time delay voltage output line and timing means connected between the timer initiating voltage input line and the time delay voltage output line for causing, a predetermined time interval after a change in voltage state appears on the timer initiating voltage input line, a voltage state change on the time delay voltage output line. The voltage state change on the time delay voltage output line is operative for causing the energizing of the control relay coil and thereby causing a time delayed voltage to be provided to a corresponding one of the time delayed outputs.

Means are included in the apparatus for interconnecting the time delay timing stages in electrical series with one another so that the time delay voltage output line of each of the timing stages, except the last-in-sequence one thereof, is electrically connected to the timer initiating voltage input line of the next-in-sequence one of the timing stages. Also included are means for changing the voltage state on the timer initiating voltage input line of the first-in-sequence one of the timing stages to thereby initiate the timing sequence.

According to an embodiment of the invention and in order to provide time delayed turn-off of the time delayed outputs, the apparatus includes time delay turn-off means for de-energizing the relays in each of the turn-on timing delay stages in a preselected, time delay turn-off sequence. This time delayed de-energizing of each of the relays causes the removing of voltage from the corresponding one of the time delay outputs. Preferably, the time delay turn-off means comprise a plurality of turn-off relays, each of which has contacts through which a corresponding one of the time delay turn-on control relays is energized when the turn-off relay contacts are closed. Moreover, according to an embodiment of the invention, the time delay turn-off means include a plurality of time delay turn-off timing stages each of which corresponds to one of the time delay turn-on timing stages and is configured in a corresponding manner. The time delay turn-off means are responsive to a control signal turning the apparatus off and are preferably configured and operative for causing the removing of voltage from the time delayed outputs in the reverse order in which the control relays cause voltage to be provided to the outputs.

It is preferred that there be at least three time delayed outputs and that a plurality of operating relays be provided, each of the operating relays having contacts connected for providing voltage from the power stage to a corresponding one of the time delayed outputs and each being connected for being energized by a corresponding one of the control relays.

The apparatus may be configured, for example by having the turn-on time delays equal to zero, so that time delay turn-off is provided without time delay turn-on of the time delayed outputs.

BRIEF DESCRIPTION OF THE DRAWINGS

A better understanding of the present invention may be had from a consideration of the following detailed description when taken in conjunction with the accompanying drawings in which:

FIG. 3 is a timing diagram showing voltages applied to and removed from time-delay outputs as a function of time after the apparatus is turned on and turned off.

FIG. 4 is a diagram showing time delay power outputs provided by the apparatus.

DESCRIPTION OF THE PREFERRED EMBODIMENT

Figure 1:
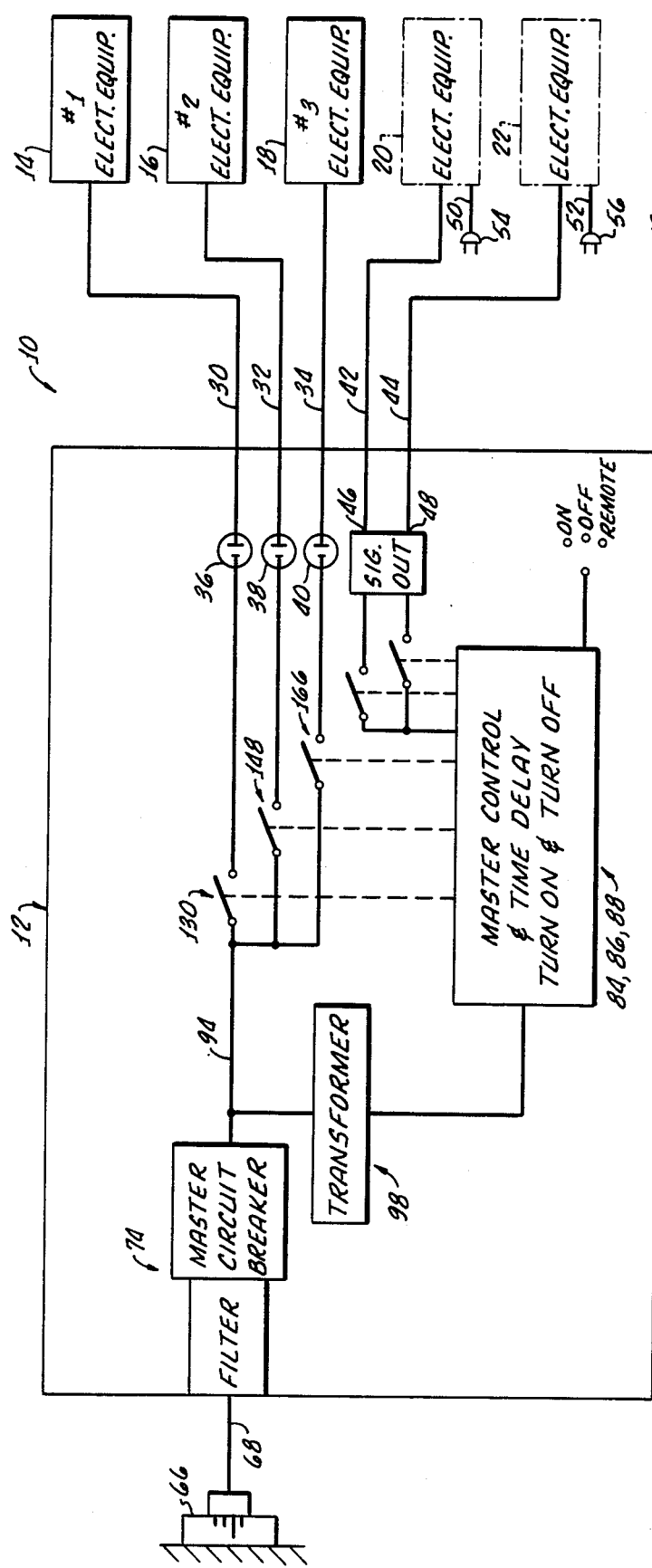
FIG. 1 is a generalized functional block diagram of an exemplary time delay power controller apparatus, in accordance with the present invention, which has the combined capability for providing to outputs both time delayed turn-on and time delayed turn-off.

There is shown, in block diagram form, in FIG. 1, an exemplary electronic or electrical system 10, in which multiple time delay power controller apparatus 12, according to the present invention, may be used to advantage. As more particularly described below, apparatus 12 is configured and is operative for controlling other pieces of electrical or electronic equipment (E.C.) such as those E.C.s designated, by way of illustrative example, in FIG. 1 by the reference numbers 14, 16, 18, 20 and 22, E.C.s 20 and 22 being shown in phantom lines for reasons to become apparent.

In general, the function of apparatus 12 is to provide timed delayed turn-on and turn-off controlling of E.C.s 14-22 (FIG. 1). In addition, one or more non-time delayed outputs may, for convenience or other purposes, be provided by apparatus 12. The time delayed outputs (as well as some or all of the non-time delayed outputs) may be of the power-type which directly power other equipment or of the signal-type which provide operating controls to other equipment not powered by apparatus 12.

For illustrative purposes, apparatus 12 is depicted in FIG. 1 as providing both power-type and signal-type outputs. Accordingly, E.C.s 14, 16 and 18 are shown as being directly powered, through respective lines 30, 32 and 34, from apparatus power outputs 36, 38 and 40, respectively. In addition, E.C.s 20 and 22 are shown as being connected by respective signal lines 42 and 44 to apparatus control signal outputs 46 and 48. Apparatus 12 may thus provide operating signals to E.C.s 20 and 22 which are separately connected, by respective power lines or cords 50 and 52, to power plugs 54 and 56.

Power is provided to apparatus 12 from an existing building electrical outlet 66 through a power cord or line 68. Building outlet 66 may, according to one version of apparatus 12, be selected to provide conventional 110 volt, A.C. power, or may, as more particularly described below (with respect to FIG. 5), be selected to provide 208 volt, 3 phase power.

As depicted in FIG. 1, for illustrative purposes and as more particularly described below, apparatus 12 may advantageously be constructed to provide both time delayed turn-on and time delayed turn-off. It is to be appreciated, however, that apparatus 12 may alternatively be constructed to provide only time delayed turn-on or only time delayed turn-off; although, there may not be any great advantage to providing time delayed turn-off in the absence of time delay turn-on.

For purposes of describing apparatus 12, the time delayed turn-on portion of apparatus 12 will be described first. Then, with this time delayed turn-on description as a foundation, the time delayed turn-off portion, which is generally similar to the time delay turn-on portion, of apparatus 12 will be described. As will also become apparent, both the time delayed turn-on and the time delayed turn-off portions share other, common portions of apparatus 12.

FIG. 2 is a specific circuit diagram illustrating a preferred embodiment of the invention. In this FIG. it should be noted that all relays are, for purposes of consistency, shown in the de-energized condition.

TIME DELAYED TURN-ON

Figure 2A:
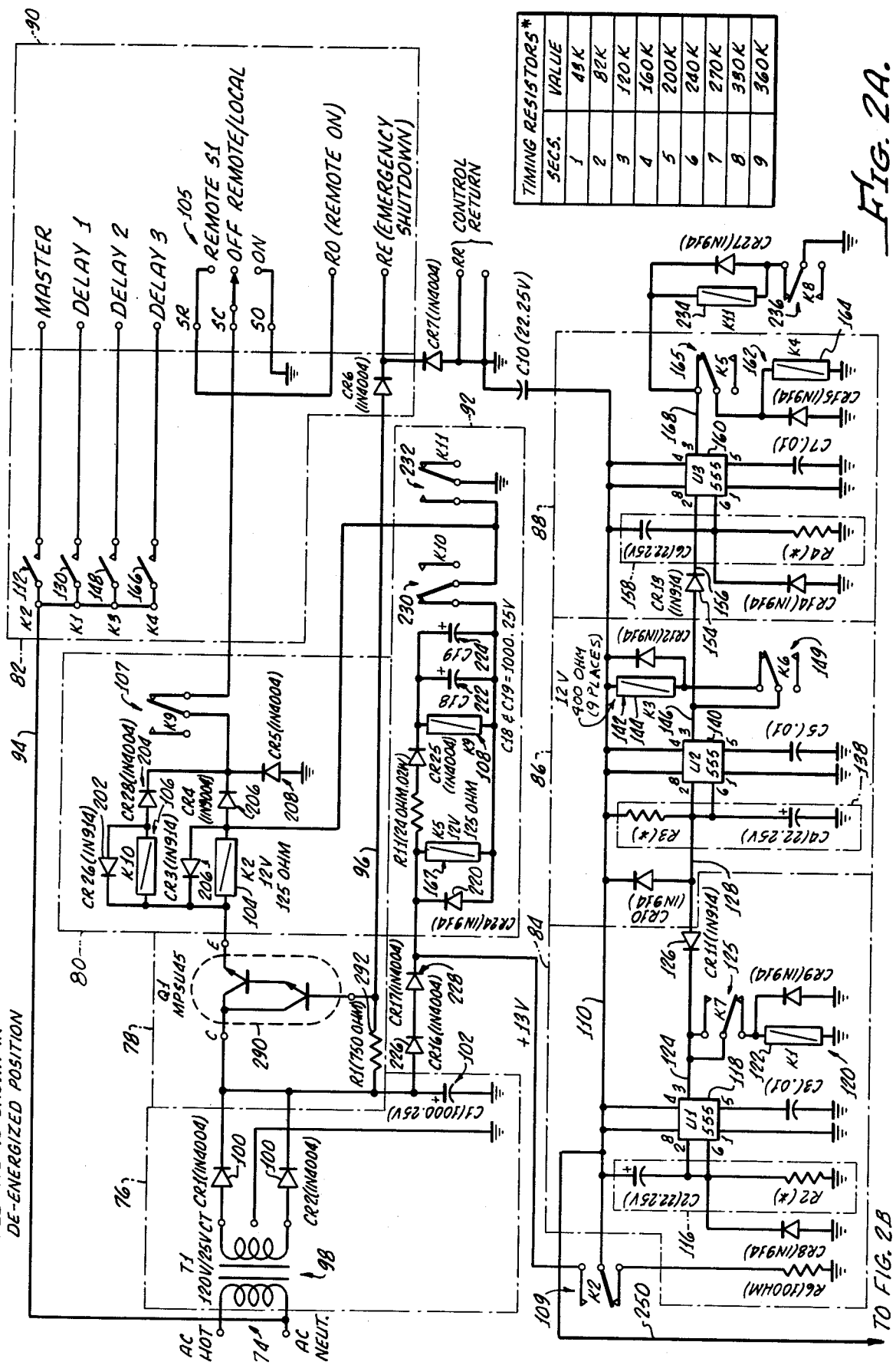
FIG. 2 is an electrical schematic drawing of the time delay power controller apparatus of FIG. 1, FIG. 2a showing a plurality of time delay turn-on stages and FIG. 2b showing a plurality of time delay turn-off stages.

With specific respect to the time delayed turn-on portion, apparatus 12 principally comprises, as depicted in the circuit schematic drawing of FIG. 2a, generally a power portion or stage 74 (which is connected by line 68 to building power outlet 66), a D.C. power supply 76, an emergency shut off stage 78, an actuating or turn-on stage 80, a relay stage 82, respective first, second and third time delay turn-on stages 84, 85 and 88 and an output stage 90. Also shown in FIG. 2a is a turn-off initiating portion 92.

Described functionally, power stage 74 provides A.C. power to other portions of apparatus 12, including, in the present embodiment, output stage 90, via an electrical conduit 94. D.C. power supply 76 provides D.C. voltage, for example, about 12-13 volts D.C., to turn-on timing delay stages 84, 86 and 88 (and also, as described below, to corresponding turn-off timing stages) for the operation thereof. Emergency shut-off stage 78 causes an automatic shut off of apparatus 12 in the event an associated emergency line 96 is shorted (i.e., grounded). Actuating stage 80 is operative for turning on apparatus 12 and for thereby starting the time delay sequencing described below. Timing delay stages 84, 86 and 88 provide a sequence of progressively time delayed signals which, through relay stage 82, control output stage 90.

For illustrative purposes, apparatus 12, as illustrated in FIG. 2a and as more particularly described below, provides a single, non-time delay output identified on such FIG. as "Master" and first, second and third time delayed (turn-on and turn-off) outputs, respectively identified as "Delay 1," "Delay 2" and "Delay 3." The "Master" and three "Delays" correspond generally to outputs 36, 38, 40 and 46 of FIG. 1. Although only first, second and third timing delay stages 84, 86 and 88 are shown in FIG. 2a, it will be apparent from the following description that additional, in-series turn-on timing delay stages (not shown) can readily be provided downstream of third stage 88 according to particular commercial or customer requirements. It will also become apparent from the following description that first, second and third turn-on timing delay stages 84, 86 and 88 are not identical but that odd numbered (i.e., first, third, fifth, seventh . . . ) stages are configured the same as one another and that even numbered (i.e., second, fourth, sixth, eighth . . . ) stages, only second stage 86 of which is illustrated, are configured the same as one another. As will be described below, there exist important differences between the odd and even numbered stages.

Described more specifically, D.C. power supply 76 comprises a conventional center tap transformer 98 which receives power from power stage 74, two diodes 100 and a capacitor 102. (The capacitance of all capacitors shown in FIG. 2 are in microfarads ($\mu$f) unless otherwise noted on such FIG.) Components of power supply 76 are selected to provide about 12-13 volts D.C., through emergency shutoff stage 78, to one side of a relay 104 (also designated as K2 in FIG. 2a).

As can be seen from FIG. 2a, when a REMOTE/LOCAL switch 105 (in output stage 90) is set to "REMOTE," and a contact closure from a remote ON/OFF switch (not shown) is applied between terminals "RO" and RR, or, alternatively, the REMOTE/LOCAL switch is set to "ON," K2 relay 104 and an associated relay 106 (K10) are energized through normally closed contacts 107 of a relay 108 (K9). This energizing of K2 relay 104 closes normally open K2 contacts 109 in actuating stage 80, in turn providing the 12-13 volts D.C. to a D.C. voltage bus 110 which extends through timing delay turn-on stages 84, 86 and 88 (as well as through any additional timing delay stages which may be connected downstream of the third-in-series stage 88). Accordingly, and as shown in FIG. 2a, timing delay turn-on stages 84, 86 and 88 are connected in electrical parallel with one another and between D.C. bus 110 and ground; however, these three stages operate sequentially, the timing out of one stage initiating the timing of the next-in-sequence stage.

Figure 3A:
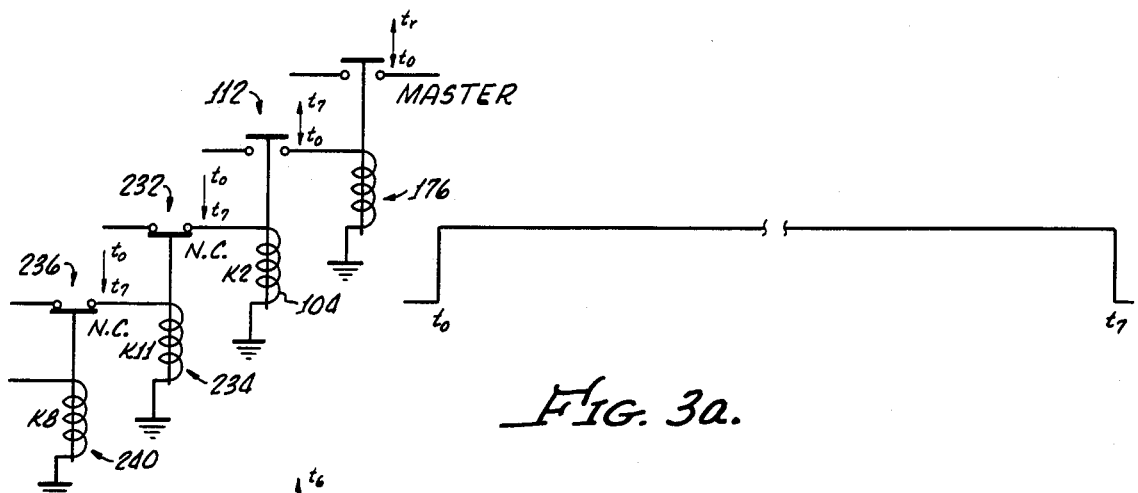
FIG. 3a showing voltages for an associated "master," non-time delayed output.

The above-described energizing of K2 relay 104 also causes the closing of K2 relay contacts 112 which thereby causes power to be applied, through conduit 94, to the non-time delayed "Master" output. Thus, the energizing of K2 relay 104 energizes D.C. bus 110 and starts the sequential operation of turn-on timing stages 84, 86 and 88, as described below, and simultaneously causes voltage to be applied to the non-time delayed "Master" output (FIG. 3a).

First timing stage 84 comprises an R-C circuit 116, connected between D.C. voltage bus 110 and ground, a type 555 integrated circuit 118 and a normally-open control relay 120 (K1) having an energizing coil 122, one side of which is connected to ground. Type 555 circuit 118 is connected between R-C circuit 116 and a time delay output line 124 to which is connected, through normally closed contacts 125 of a relay 127 (relay K7, FIG. 2b), to the other side of K1 relay coil 122.

Figure 3B:
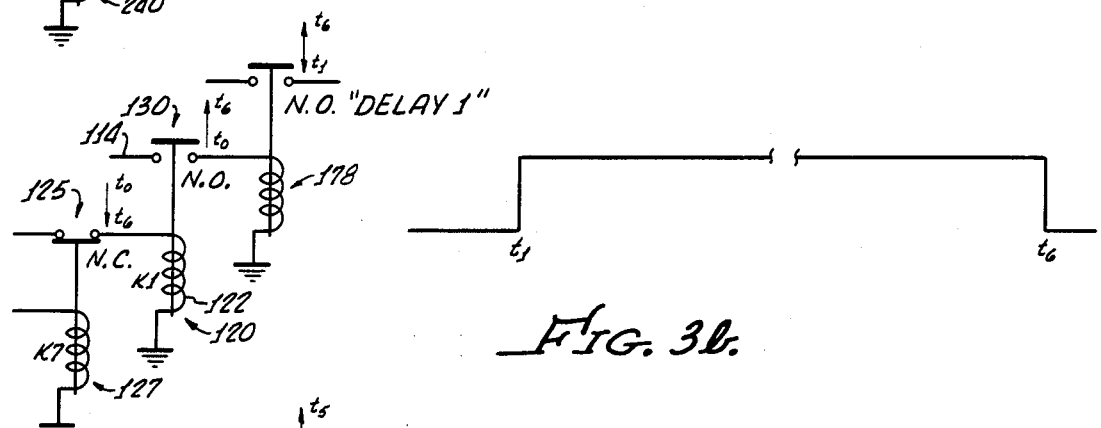
FIG. 3b showing voltages for a first time delay output.
Figure 4A:
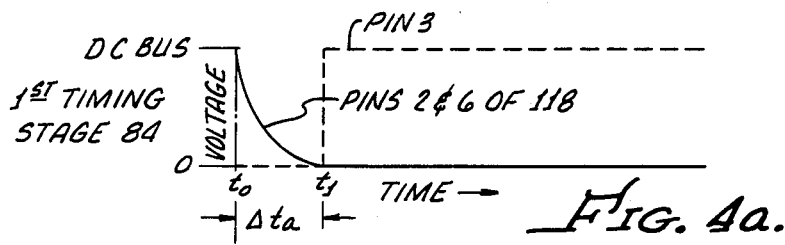
FIG. 4a showing the output of a first time delay turn-on stage.

Configuration of first stage 84 is such that at time $t_o$, when D.C. voltage from power supply 76 is provided to bus 110 by the closing of K2 relay contacts 109, the voltage provided to one side (pins 2 and 6, as shown in FIG. 2a) of type 555 circuit 118 decreases from the voltage towards ground, the voltage decrease time being equal to the time delay interval, $\Delta t_m$, provided by R-C circuit 116. Time delay voltage output line 124 is connected, through a diode 126, to a timer initiating voltage input line 128 of second timer stage 86 in such a manner that at time, $t_o$, such output line is at ground potential, K1 relay coil 122 being thereby non-energized After time interval, $\Delta t_m$, at a time, $t_1$, when the voltage at pins 2 and 6 of type 555 circuit 118 decreases to a preselected voltage, for example, about ⅓ of D.C. bus voltage, such circuit causes the voltage state on output line 124 to abruptly change (switch) from zero to bus voltage (FIG. 4a), thereby energizing (through K7 contacts 125) K1 relay coil 122 and causing contacts 130 of K1 relay 120 to close (FIG. 3b). The voltage state on output line 124 thereafter remains constant (at D.C. bus voltage) and K1 relay contacts 130 remain closed until apparatus 12 is subsequently turned off, at which time, all relay coils may be de-energized at once, or may, as more particularly described below, be de-energized in a time delayed sequence so that connected pieces of equipment are turned off in a predetermined, time delayed manner.

K1 relay contacts 130 are connected by conduit 94 to apply line voltage to "Delay 1" output when such contacts are closed. Alternatively, depending upon the type of relays being used, K1 relay contacts may be connected to D.C. bus 110 to apply bus voltage to "Delay 1" output. Thus, at time, $t_1$, after initial time delay, $\Delta t_m$, line voltage (or alternatively, D.C. bus voltage) is applied through, K1 contacts 130, to "Delay 1" output, such voltage being maintained until apparatus 12 is turned voltage being maintained until apparatus 12 is turned off, as described below.

Second timing stage 86 is similar to the above-described first timing stage 84 and comprises an R-C circuit 138, a type 555 integrated circuit 140 and a normally-open control relay 142 (K3) having an energizing coil 144. A time delay voltage input line 146 is connected to an output (pin 3) of type 555 circuit 140, input pins 2 and 6 of such circuit being connected to R-C circuit 138 and pins 4 and 8 thereof being connected to D.C. bus 110.

Figure 2B:
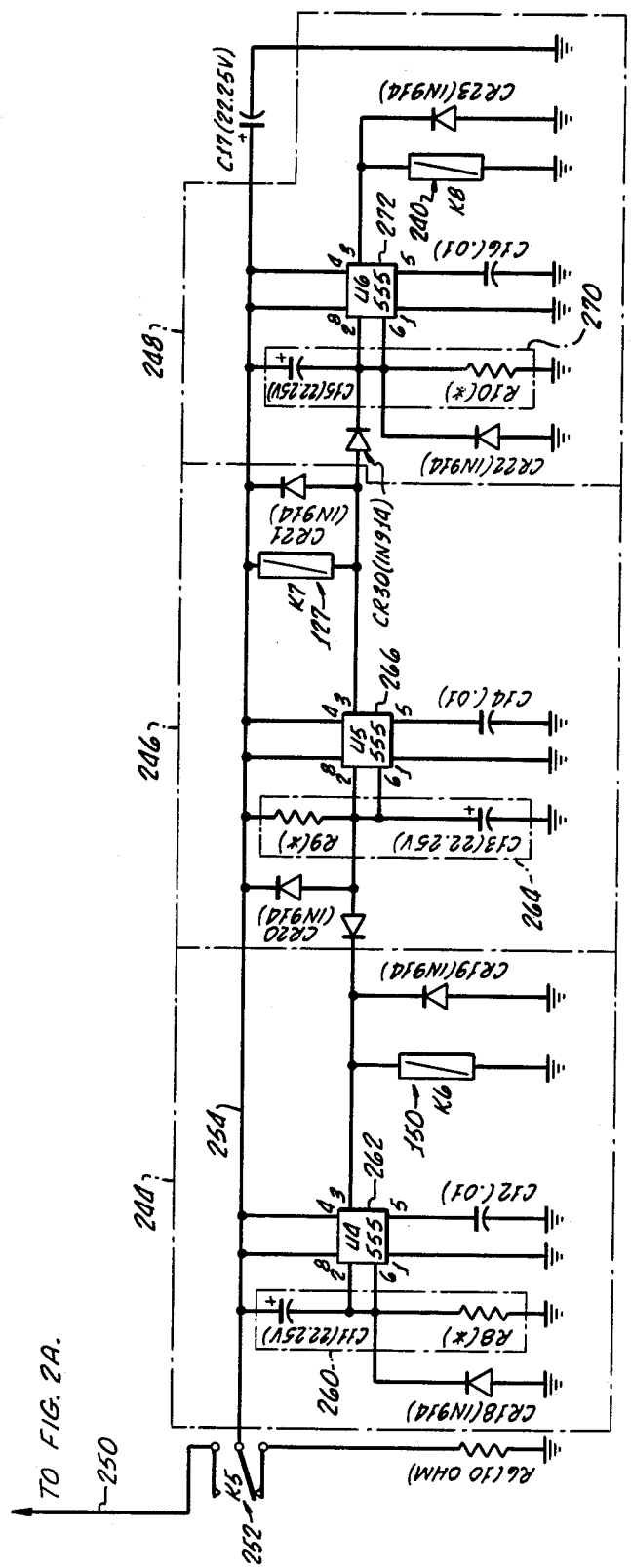

A principal and significant difference between second timing stage 86 and first timing stage 84 is, however, that second stage relay coil 144 is connected between time delay output voltage line 146 and D.C. bus 110, through normally closed contacts 149 of a relay 150 (K6). FIG. 2b, instead of between such output line and ground, as is the case for corresponding first stage K1 relay coil 122. As is apparent from FIG. 2a, voltage output line 146 goes to D.C. bus voltage when bus 110 is energized (assuming K6 relay contacts 149 are closed). As a result, K3 relay coil 144 remains unenergized and contacts 148 (in relay stage 82) of K3 relay 142 remain open until second timing stage "times out." R-C circuit 116 and type 555 integrated circuit 118 function together as a timing circuit or means, the R-C circuit providing a ramping voltage which causes or enables the associated type 555 circuit to change the voltage state on output line 124 when the voltage provided by the R-C circuit ramps down to a predetermined voltage level.

Figure 3C:
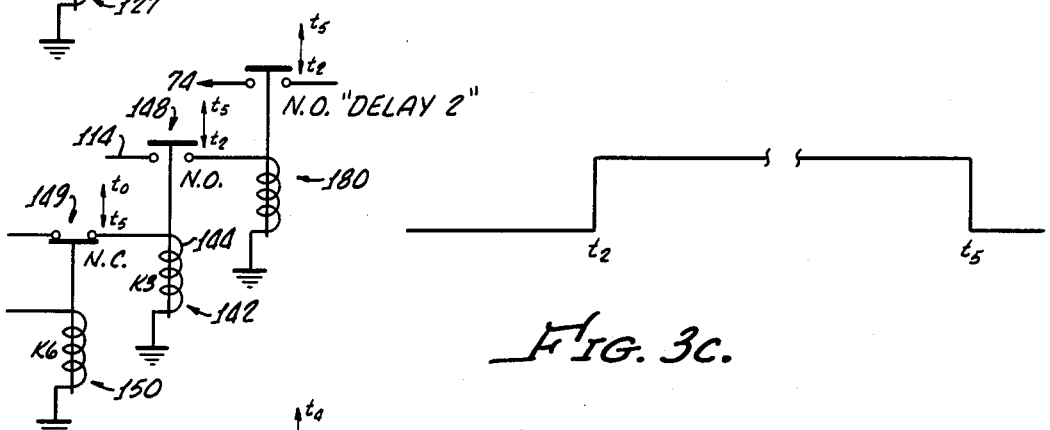
FIG. 3c showing voltages for a second time delay output.
Figure 4B:
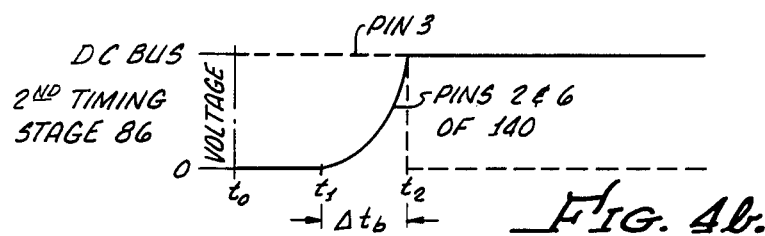
FIG. 4b showing the output of a second time delay turn-on stage.

As described above with respect to first timing stage 84, time delay output line 124, which is electrically connected through diode 126 to timer initializing voltage input line 128 of second timing stage 86, remains at ground potential until R-C circuit 116 and type 555 circuit "time out" (at time t1). At such time, type 555 circuit 118 flips the voltage state on output line 124 to D.C. bus voltage. Such flipping of voltage state on output line 124 turns off diode 126 and thereby starts the charging of second stage R-C circuit 138 from ground potential towards D.C. bus voltage. When, at a time $t_2$, after a charging time interval, $\Delta t_b$, pins 2 and 6 of type 555 circuit 140, which are connected to R-C circuit 138, reach about ⅔ D.C. bus voltage, the type 555 circuit causes the voltage state on pin 3 and hence on time delay voltage output line 146 to flip from D.C. bus voltage to ground (FIG. 4b). This voltage state change on output line 146 from bus voltage to ground causes K3 relay coil 144 to be energized, thereby closing K3 relay contacts 148 (FIG. 3c) and providing voltage to "Delay 2" output. R-C circuit 138 and type 555 circuit 140 function together as timing means.

Output line 146 of second timing stage 86 is connected through a diode 154 to timer initiating voltage input line 156 of third timing stage 88. The flipping of second stage output line 146 from bus voltage to ground potential at time, $t_2$, turns off diode 154, thereby causing an R-C circuit 158 of third time delay timing stage 88 to start discharging from D.C. bus voltage to ground potential.

Third time delay timing stage 88 is preferably a replicate of first timing stage 84, comprising, in addition to R-C circuit 158, a type 555 integrated circuit 160 and a normally-open relay 162 (K4) having a relay coil 164 and contacts 166 (in relay stage 82). One side of K4 relay coil 164 is connected, through normally closed contacts 165 of a relay 167 (K5), to a time delayed voltage output line 168 which is, in turn, connected to output pin 3 of type 555 circuit 160. The other side of K4 relay coil 164 is connected to ground. R-C circuit 158 and type 555 circuit 160 function together as a timer or timing means.

Accordingly, one side of the relay coil of every odd numbered timing stage (for example, relay coils 122 and 164 of first and third stages 84 and 88, respectively) is connected to ground. In contrast, one side of the relay coil of every even numbered timing stage (for example, coil 144 of second stage 86 and a corresponding coil of a fourth stage—not shown—which might be connected in series with third stage 86) is connected to D.C. bus 110.

Figure 4C:
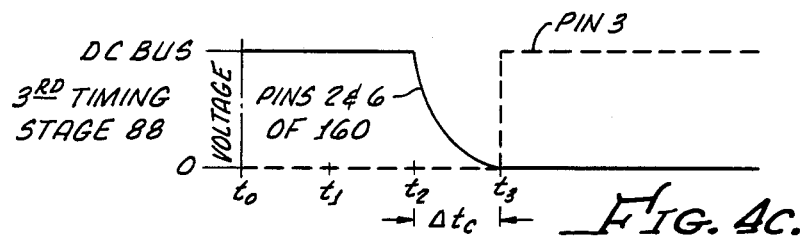
FIG. 4c showing the output of a third time delay turn-on stage.

At time, $t_2$, when diode 154 and third timing input line 156 are turned off by second stage type 555 circuit 140 flipping the voltage state on output line 146 from D.C. bus voltage to ground, R-C circuit 158 starts discharging. A time interval, $\Delta t_c$, later at time $t_3$ (FIG. 4c), when R-C circuit 158 discharges and pins 2 and 6 of type 555 circuit 160 drop to about ⅓ of D.C. bus voltage, such circuit 160 causes the voltage state at pin 3, and therefore time delay voltage output line 168, to flip from its previous ground potential to D.C. bus voltage.

Figure 3D:
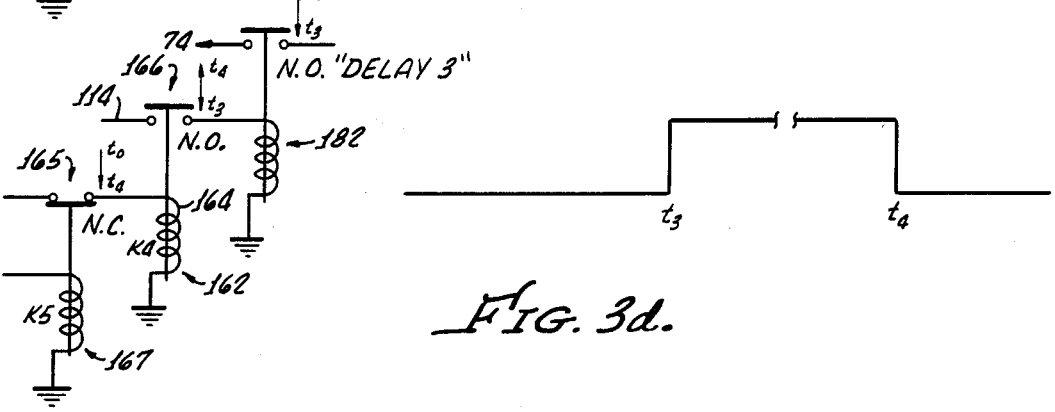
FIG. 3d showing voltages for a third time delay output.

When output line 168 is at ground potential, K4 relay coil 164 remains unenergized and K4 relay contacts 166 remain open. When, at time $t_3$, D.C. bus voltage is applied to output line 168, K4 relay 164 is energized (assuming contacts 165 of K5 relay 157 remain closed), thereby closing K4 contacts 166 and applying voltage to "Delay 3" output (FIG. 3d).

The above-described configuration of second and third turn-on timing stages 86 and 88 assures that the second stage does not enter its timing delay cycle until time t1, when first timing stage 84 "times out," and that the third stage does not enter its timing delay cycle until the second stage "times out" at time $t_2$. As a result, outputs "Delay 1," "Delay 2" and "Delay 3" are provided voltage in a time delayed sequence at times $t_1$, $t_2$ and $t_3$, such time delayed outputs being maintained until apparatus 12 is turned off. As more particularly described below, the turning off of these outputs may be in a time delayed manner so that the outputs are step-wise de-energized.

The present inventors have determined that satisfactory time delayed turn-on operation of apparatus 12 cannot be achieved if all timing delay stages are constructed identically with relay coils 122, 144 and 164 all being connected either to ground or to D.C. bus 110. For example, it has been found that if second and third timing stages 86 and 88 are constructed identically with first timing stage 84, on and off voltage pulses are applied to "Delay 2" and "Delay 3" outputs before the desired time delayed control voltages are provided to such outputs. To prevent such occurrance by having all relay coils 122, 144 and 164 connected in the same manner either to ground or to D.C. bus 110 would require that R-C circuits 138 and 158 be constructed to provide delays equal respectively to $(\Delta t_a + \Delta t_b)$ and $(\Delta t_a + \Delta t_b + \Delta t_c)$.

However, with the above-described configuration, all three timing stages 84, 86 and 88 can be and are made identical except for the connection of relay coils 122, 144 and 164. As a result, all time delays $\Delta t_a$, $\Delta t_b$ and $\Delta t_c$ are, as is generally desirable, equal to one another and no spurious voltage signals are provided to "Delay 1," "Delay 2" or "Delay 3" outputs.

In the event the "Master" and the "Delay 1," "Delay 2" and "Delay 3" outputs are of the power output type, voltages provided by the closing of respective relay contacts 112, 130, 148 and 166 are used to actuate normally-open power relays 176, 178, 180 and 182, respectively, (FIGS. 3a–d), which are connected to receive line power from power stage 74. Accordingly, power relays 176, 178, 180 and 182 are actuated at respective times $t_0$, $t_1$, $t_2$ and $t_3$ to provide power to the "Master," "Delay 1," "Delay 2" and "Delay 3" outputs.

Figure 5:
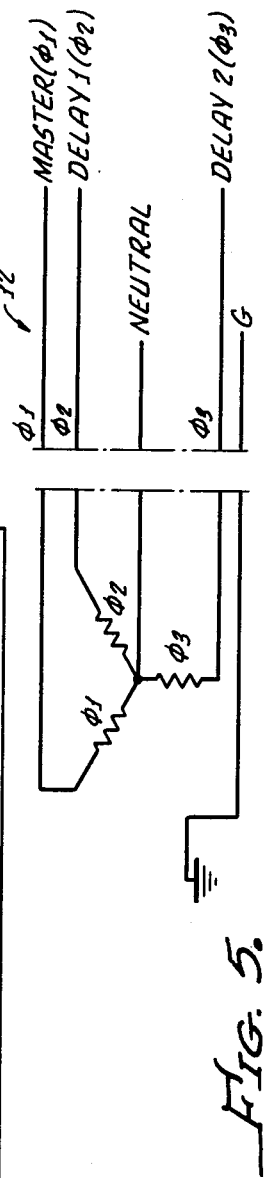
FIG. 5 is a partial schematic drawing showing connection of the apparatus to a 208 volt, 3 phase power source.

When, for example, as indicated in FIG. 5, three power outputs (e.g., "Master," "Delay 1" and "Delay 2") of apparatus 12 are connected into a conventional 3 phase power circuit, each power output may be connected (e.g., through respective relays 176, 178 and 180) to receive power from a different one of the power source phases. When the power source is a conventional 208 volt, 3 phase source, each power output is thus provided with about 115 volts. Powering apparatus 12 in such a manner is advantageous in that greater power can be delivered to the apparatus power outputs than is generally otherwise possible when each power output is connected through apparatus 12 to a conventional 110 volt power source.

From the foregoing description, it is apparent that when K2 contacts 109, through which D.C. bus 110 is powered, are opened, as by turning apparatus 12 off, all relays 120 (K1), 142 (K3) and 162 (K4) are de-energized. Turning apparatus 12 off also de-energizes K2 relay 104. As a result, voltage through conduit 94 is no longer provided to "Master," "Delay 1," "Delay 2" and "Delay 3" and all such outputs are deactivated at the same instant of turn-off. However, as mentioned above, it is often desirable or necessary that the outputs be de-energized in a time delayed manner comparable to the turn-on delay sequencing just described. Therefore, apparatus 12 is shown in FIG. 2 as advantageously including circuitry enabling such time delayed turn-off in addition to the above-described time delay turn-on.

TIME DELAYED TURN-OFF

In accordance with the foregoing description of the time delay turn-on portion of apparatus 12, the energizing of the delayed outputs "Delay 1" through "Delay 3" is controlled through time delay stages 84, 86 and 88, by relays 122 (K1), 142 (K2) and 162 (K4), the "Master" output being energized through K2 relay 104 which also energizes D.C. bus 110. However, the energizing of relays 122, 142 and 162 is, as was described, controlled respectively by contacts 125, 148 and 165 of respective K7, K6 and K5 relays 127, 150 and 167, which, with other circuitry of apparatus 12, provide time delayed turn-off of the outputs.

To provide for time delayed turn-off of the outputs, there is included K10 relay 106 in association with relay 104 (K2), FIG. 2a. Connected in parallel with K10 relay 106 is a diode 202 and connected in series with such K10 relay is a diode 204. A diode 206 is connected in series with K2 relay 104, still another diode 208 being connected between both diodes 204, 206 and ground. Both relays 104 (K2) and 106 (K10) are connected through respective diodes 204 and 206 and through K9 contacts 107 to REMOTE/LOCAL switch 105, shown in FIG. 2a as part of output portion 90.

Portion 92 comprises K5 and K9 relays 167 and 108 in parallel. A diode 220 is connected in parallel with K5 relay 167 and capacitors 222 and 224 are connected in parallel with K9 relay 108. Portion 92 is connected to the output of transformer 98 through series diodes 226 and 228. One side of both K5 and K7 relays 167 and 127 are grounded through respective normally open contacts 230 and 232 of K10 relay 106 and a relay 234 (K11) which is connected to the output of third time delay turn-on stage 88. As shown in FIG. 2a, the other side of K11 relay 234 is connected to ground through normally closed contacts 236 of a relay 240 (K8).

Shown in FIG. 2b, in association with the above-described first, second and third turn-on time delay stages 84, 86 and 88, respectively, are directly corresponding, respective first, second and third turn-off time delay stages 244, 246 and 248. A conduit 250 which is connected to D.C. bus 110 provides voltage, through normally open contacts 252 of K5 relay 167, to a D.C. bus 254 which extends through stages 244, 246 and 248 which are in electrical parallel between the bus and ground, but which, as described below, are connected to operate in sequence.

Generally comprising first turn-off time delay stage 244 are an R-C circuit 260, a type 555 integrated circuit 262 and K6 relay 150. Similarly comprising second turn-off time delay stage 246 are an R-C circuit 264, a type 555 circuit 266 and K7 relay 127. In turn generally comprising third turn-off time delay stage 248 are an R-C circuit 270, a type 555 circuit 272 and K8 relay 240. Configuration and operation of first, second and third turn-off time delay stages 244, 246 and 248, respectively, are substantially the same as described above for corresponding ones of first, second and third turn-on time delay stages 84, 86 and 88, with respect to FIG. 2a, and can, therefore, best be described in terms of their operation in controlling the turn off of "Delay 1" through "Delay 3" outputs.

Assuming, as above-described, apparatus 12 has been turned on and time delayed voltages have been applied to "Master" and "Delay 1" through "Delay 3" outputs (FIGS. 3a–3d). The "power down," time delayed turn-off of these outputs is initiated by removing the contact closure between terminals "RO" and "RR" (FIG. 2a) or by setting REMOTE/LOCAL switch 105 to "OFF." Either of these operations first de-energizes K10 relay 106. This, in turn, causes K10 contacts 230 to return to their normally closed condition and energize K5 relay 167 and K9 relay 108, thereby causing K5 contacts 165 to open and turn off K4 relay 162 (in third turn-on time delay stage 88, FIG. 2a) which then disables (turns-off) "Delay 3" output at a time equal to $t_4$ (FIG. 3d).

Figure 4D:
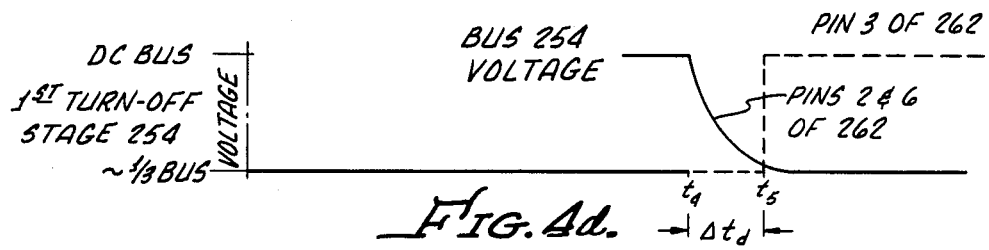
FIG. 4d showing the output of a first time delay turn-off stage.

As K5 relay 167 de-energizes K4 relay 162, K5 contacts 252 close and D.C. voltage is applied, through conduit 250, to time delay turn-off bus 254 to start the operation of first, second and third turn-off stages 244, 246 and 248, respectively. The voltage at pins 2 and 6 of type 555 circuit 262 of first time delay turn-off stage 244 is taken to the voltage of bus 254 and then begins to decay to ground through the resistor in R-C circuit 260. When the voltage at pins 2 and 6 decays to about ⅓ of the bus voltage, after a time, $\Delta t_a$ and at time $t_5$, pin 3 of type 555 circuit 262 switches to D.C. bus voltage (FIG. 4d), thereby energizing K6 relay 150. When K6 relay 150 is so energized, its contacts 149 (FIG. 2a) open circuit coil 144 of K3 relay (in second turn-on time delay stage 86), thereby disabling (de-energizing) "Delay 2" output (FIG. 3c) at time $t_5$.

Figure 4E:
FIG. 4e showing the output of a second time delay turn-off stage.

At the same time, $t_5$, pins 2 and 6 of type 555 circuit 266 of second turn-off time delay stage 246 start ramping up to the D.C. voltage of bus 254. After time, $\Delta t_d$, at time $t_e$, when pins 2 and 6 reach about ⅔ of the bus voltage, pin 3 of type 555 circuit 266 switches from bus voltage to ground (FIG. 4e), thereby energizing K7 relay 127. This energizing of K7 relay 127 opens K7 contacts 125 and de-energizes K1 relay 120 in first turn-on time delay stage 84 (FIG. 2a), thereby disabling (deenergizing) "Delay 1" at time $t_6$.

Figure 4F:
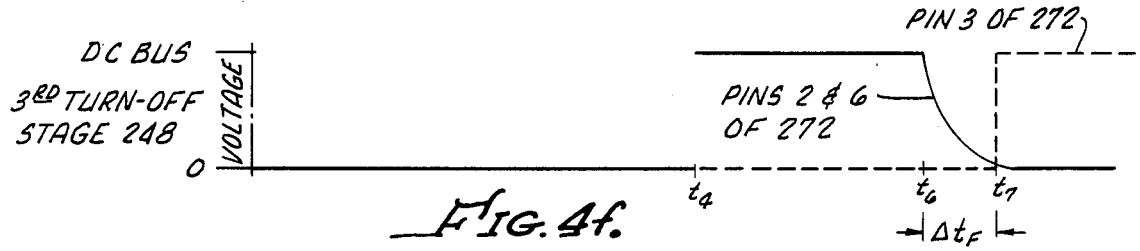
FIG. 4f showing the output of a third time delay turn-off stage.

Also at time $t_6$, when pin 3 of type 555 circuit 266 switches to ground, pins 2 and 6 of type 555 circuit 272 (of third turn-off time delay stage 248, FIG. 2b) start decreasing in voltage to ground from D.C. bus voltage. When the voltage at pins 2 and 6 falls to about ⅓ bus voltage, after a time interval of $\Delta t_f$, at time $t_7$, pin 3 of 555 circuit 272 switches to bus voltage (FIG. 4f), thereby energizing K8 relay 240. This causes K8 relay contacts 236 (FIG. 2a) to open, thereby turning off K11 relay 234 which, in turn, causes K2 relay 104 (FIG. 2a) to be de-energized, thereby disabling (de-energizing) "Master" output (FIG. 3a) and de-energizing, through K2 contacts 108, D.C. bus 110 of the turn-on time delay portion. Apparatus 12 can then be switched off.

Emergency shutdown is accomplished through a Darlington transistor 290 which is biased into conduction by resistor 292 (FIG. 2a). Shutdown is accomplished by closing the contacts between terminals "RE" and "RR" which diverts the base current out of the transistor and de-energizes K2 relay 104 and K10 relay 106, thereby resetting the entire circuit. In the event of such an emergency shutdown, no time delayed turn-offs are provided and when the emergency shutdown contact closure is removed, the time delayed turn-on sequence will be reinitiated unless either REMOTE/LOCAL switch 105 or the remote On/Off switch (not shown) has first been set to an off position.

Although apparatus 12, as illustrated in the FIGS. and as described herein, is configured for providing a time delayed turn-off of "Master" and "Delay 1" through "Delay 3" outputs in the reverse sequence of their turn on, it is to be appreciated that it is within the scope of the invention to provide for other sequences of turning off the outputs. Also, it is to be appreciated that the time delayed turn-off sequencing can be applied to outputs which have been turned on simultaneously. In such case, time delay turn-on stages 84, 86 and 88 may each be configured for a zero turn-on time delay.

(The following detailed notes are provided to further explaining details of the circuit schematic diagram of FIG. 2, the circuit element designations being principally used instead of reference numbers—unless reference numbers have previously been assigned, to assist in better understanding the circuit:

1. Referring to turn-off initiating portion, FIG. 2a, capacitors C-18 and C-19 (222 and 224), which are in parallel with K9 relay 108, provide a release delay for such relay. This release delay prevents an associated sequencer from turning all controlled outputs on if the contact closure is restored between "RO" and "RR" or REMOTE/LOCAL switch 105 is set to "ON" during the time delay turn-off sequence described above. This release delay of K9 relay 108 also ensures that both the time delay turn-on circuitry and the time delay turn-off circuitry are properly reset before a time delay turn-on sequence can be started. Resistor R11 limits in-rush current to capacitors C18 and C19 to a suitable value. Diode CR25 restricts the discharge path of the capacitors to only K9 relay 108.

2. Diodes CR3 (206), CR9, CR12, CR15, CR19, CR21, CR23, CR24 (220), CR26 (202) and CR27 provide reverse EMF protection for their associated relays.

3. Diodes CR8, CR10, CR14, CR18, CR20 and CR22 provide quick discharge paths for their respective R-C circuits.

4. Resistors R6 and R7 limit discharge current during reset conditions to a value suitable for the associated relays.

5. Diodes CR4 (206), CR5, CR6, CR& and CR28 provide circuit protection from undesired external voltages and currents which might inadvertently be applied to remote control terminals "RO" and "RE."

6. The timing resistors R2, R3, R4, R8, R9, and R10 are selectable to provide different time periods for both the time delay turn-on and turn-off sequences.)

It is to be appreciated that although there has been described above a particular arrangement of a time delay power controller with time delayed turn-on and turn-off, in accordance with the present invention for the purpose of illustrating a manner in which the invention may be used to advantage, the invention is not so limited. Accordingly, any and all variations and modifications which may occur to those skilled in the art are to be considered to be within the scope and spirit of the invention as defined in the appended claims.

What is claimed is:

1. Time delay power controller apparatus which comprises:
   (a) a power stage and means for connecting said power stage to a conventional power source;
   (b) a plurality of time delayed outputs;
   (c) a D.C. voltage bus and a ground;
   (d) a D.C. power supply connected between the power stage and the D.C. bus;
   (e) a plurality of time delay, turn-on timing stages connected between said D.C. bus and ground.
   each of said turn-on timing delay stages comprising a timer initiating voltage input line, a time delay voltage output line, a control relay having an energizing coil connected to said time delay voltage output line and timing means connected between said timer initiating voltage input line and the time delay voltage output line for causing, a predetermined time interval after a change in voltage state appears on said timer initiating voltage input line, a voltage state change on said time delay voltage output line, said voltage state change on said time delay voltage output line causing the energizing of said control relay coil and thereby causing a time delayed voltage to be provided to a corresponding one of the time delayed outputs;

(f) means for interconnecting said time delay timing stages in electrical series with one another, the time delay voltage output line of each of said timing stages, except the last-in-sequence one thereof, being electrically connected to the timer initiating voltage input line of the next-in-sequence one of the timing stages; and (g) means for changing the voltage state on the timer initiating voltage input line of the first-in-sequence one of the timing stages to thereby initiate the timing sequence.

2. The time delay power controller apparatus as claimed in claim 1 including time delay turn-off means for de-energizing the relays in each of the turn-on timing delay stages in a preselected, time delay turn-off sequence, the de-energizing of each of the relays causing the removing of voltage from the corresponding one of the time delay outputs.

3. The time delay power controller as claimed in claim 2 wherein the time delay turn-off means comprise a plurality of turn-off relays, each of said turn-off relays having contacts through which a corresponding one of the time delay turn-on control relays is energized when the turn-off relay contacts are closed.

4. The time delay power controller apparatus as claimed in claim 2 wherein the time delay turn-off means include a plurality of time delay turn-off timing stages each of which corresponds to one of the time delay turn-on timing stages.

5. The time delay power controller apparatus as claimed in claim 2 wherein the time delay turn-off means are responsive to a control signal turning the aparatus off.

6. The time delay power controller apparatus as claimed in claim 2 wherein the time delay turn-off means are operative for causing the removing of voltage from the time delayed outputs in the reverse order in which the control relays cause voltage to be provided to said outputs.

7. The time delay power controller apparatus as claimed in claim 2 wherein there are at least three time delayed outputs.

8. The time delay power controller apparatus as claimed in claim 1 including a plurality of operating relays, each of said operating relays having contacts connected for providing voltage from the power stage to a corresponding one of the time delayed outputs and each being connected for being energized by a corresponding one of the control relays.

9. Time delay power controller apparatus which comprises:

(a) a power stage and means for connecting said power stage to a conventional power source;
(b) a plurality of time delayed outputs;
(c) a D.C. voltage bus and a ground;
(d) a D.C. power supply connected between the power stage and the D.C. bus;
(e) a plurality of time delay, turn-on timing stages connected between said D.C. bus and ground.

each of said turn-on timing delay stages comprising a timer initiating voltage input line, a time delay voltage output line, a control relay having an energizing coil connected to said time delay voltage output line and timing means connected between said timer initiating voltage input line and the time delay voltage output line for causing, a predetermined time interval after a change in voltage state appears on said timer initiating voltage input line, a voltage state change on said time delay voltage output line, said voltage state change on said time delay voltage output line causing the energizing of said control relay coil and thereby causing a time delayed voltage to be provided to a corresponding one of the time delayed outputs;

(f) means for interconnecting said time delay timing stages in electrical series with one another, the time delay voltage output line of each of said timing stages, except the last-in-sequence one thereof, being electrically connected to the timer initiating voltage input line of the next-in-sequence one of the timing stages;

(g) means for changing the voltage state on the timer initiating voltage input line of the first-in-sequence one of the timing stages to thereby initiate the timing sequence; and (h) time delay turn-off means for de-energizing the relays in each of the turn-on timing delay stages in a preselected, time delay turn-off sequence, the deenergizing of each of the relays causing the removing of voltage applied to the corresponding one of the time delay outputs thereby.

10. The time delay power controller as claimed in claim 9 wherein the time delay turn-off means comprise a plurality of turn-off relays, each of said turn-off relays having contacts through which a corresponding one of the time delay turn-on control relays is energized when the turn-off relay contacts are closed.

11. The time delay power controller apparatus as claimed in claim 9 wherein the time delay turn off means include a plurality of time delay turn-off timing stages each of which corresponds to one of the time delay turn-on timing stages.

12. The time delay power controller apparatus as claimed in claim 9 wherein the time delay turn-off means are responsive to a control signal turning the aparatus off.

13. The time delay power controller apparatus as claimed in claim 9 wherein the time delay turn-off means are operative for causing the removing of voltage from the time delayed outputs in the reverse order in which the control relays cause voltage to be provided to said outputs.

14. The time delay power controller apparatus as claimed in claim 9 including a plurality of operating relays, each of said operating relays having contacts connected for providing voltage from the power stage to a corresponding one of the time delayed outputs and each being connected for being energized by a corresponding one of the control relays.

15. The time delay power controller apparatus as claimed in claim 9 wherein the predetermined time interval provided by the timing means of each of the time delay turn-on timing stages is equal to zero.

16. Time delay power controller apparatus which comprises:

(a) a power stage and means for connecting said power stage to a conventional power source;
(b) a plurality of time delayed outputs;
(c) a D.C. voltage bus and a ground;
(d) a D.C. power supply connected between the power stage and the D.C. bus;
(e) a plurality of time delay, turn-on timing stages, each of said turn-on timing stages being connected between said D.C. bus and ground and each including means for providing a time delayed voltage to a corresponding one of the time delayed outputs in accordance with a preestablished turn-on time delay schedule; and
(f) means for removing the voltages applied to the time delayed outputs by the time delay turn-on timing stages according to a preestablished turn-off time delay schedule.

17. The time delay power controller apparatus as claimed in claim 16 wherein each of the time delay turn-on timing stages comprises a timer initiating voltage input line, a time delay voltage output line, a control relay having an energizing coil connected to said time delay voltage output line and timing means connected between said timer initiating voltage input line and the time delay voltage output line for causing, a predetermined time interval after a change in voltage state appears on said timer initiating voltage input line, a voltage state change on said time delay voltage output line, said voltage state change on said time delay voltage output line causing the energizing of said control relay coil and thereby causing a time delayed voltage to be provided to a corresponding one of the time delayed outputs; and including means for interconnecting said time delay timing stages in electrical series with one another, the time delay voltage output line of each of said timing stages, except the last-in-sequence one thereof, being electrically connected to the timer initiating voltage input line of the next-in-sequence one of the timing stages and means for changing the voltage state on the timer initiating voltage input line of the first-in-sequence one of the timing stages to thereby initiate the timing sequence.

18. The time delay power controller apparatus as claimed in claim 17 wherein the time delay turn-off timing means comprise a plurality of turn-off relays, each of the control relay coils being energized through a corresponding one of the turn-off relays.

19. The time delay power controller apparatus as claimed in claim 16 wherein the time delay turn-off timing means are connected for removing voltage from the time delayed outputs in the reverse order in which voltage is provided to said outputs.

20. The time delay power controller apparatus as claimed in claim 16 wherein the time delay turn-on timing stages are connected for providing voltages to the time delayed outputs at the same time.

* * * * *